United States Patent
Morita et al.

(10) Patent No.: US 9,131,101 B2
(45) Date of Patent: Sep. 8, 2015

(54) IMAGE READING APPARATUS (71) Applicant: BROTHER KOGYO KABUSHIKI KAISHA, Nagoya-shi, Aichi-ken (JP)

(72) Inventors: Kyoichi Morita, Anjo (JP); Isao Kubo, Tokoname (JP); Hidenobu Kondo, Nagoya (JP); Takahiro Ikeno, Seto (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/592,024

(22) Filed: Jan. 8, 2015

(65) Prior Publication Data
US 2015/0201102 A1    Jul. 16, 2015

(30) Foreign Application Priority Data

Jan. 10, 2014    (JP) ................................. 2014-003412

(51) Int. Cl.
  *H04N 1/04*    (2006.01)
  *H04N 1/047*   (2006.01)
  *H04N 1/00*    (2006.01)
  *H04N 1/053*   (2006.01)

(52) U.S. Cl.
  CPC ......... *H04N 1/0476* (2013.01); *H04N 1/00588* (2013.01); *H04N 1/053* (2013.01); *H04N 2201/0081* (2013.01); *H04N 2201/0094* (2013.01)

(58) Field of Classification Search
  CPC . H04N 1/0476; H04N 1/00588; H04N 1/053; H04N 2201/0094; H04N 2201/0081
  USPC .......................................... 358/498, 497, 474
  See application file for complete search history.

(56) References Cited

U.S. PATENT DOCUMENTS

| 2007/0195379 | A1  | 8/2007 | Suga |
| 2011/0102864 | A1  | 5/2011 | Ishikawa |
| 2014/0218772 | A1* | 8/2014 | Koshimizu .................... 358/461 |
| 2015/0092254 | A1* | 4/2015 | Sakakibara et al. .......... 358/498 |

FOREIGN PATENT DOCUMENTS

| JP | 4201008 B2     | 10/2008 |
| JP | 2009-246636 A  | 10/2009 |
| JP | 2011-044783 A  | 3/2011  |

(Continued)

OTHER PUBLICATIONS

U.S. Appl. No. 14/621,032, filed in related case on Feb. 12, 2015.

*Primary Examiner* — Houshang Safaipour
(74) *Attorney, Agent, or Firm* — Merchant & Gould PC (57) ABSTRACT

An image reading apparatus includes: a reading unit which reads an original as an object to be read in a main scanning direction every time a command signal is inputted; a command unit which inputs the command signal to the reading unit; a conveying unit which conveys at least one of the original and the reading unit so as to change a relative position between the reading unit and the original in a sub scanning direction; a signal output unit which outputs a displacement signal every time the relative position is changed by a predetermined amount; and a control unit which controls the command unit. The command unit which operates in a first mode to output the command signal to the reading unit at a predetermined time interval and in a second mode to output the command signal to the reading unit at a timing synchronized with the displacement signal.

8 Claims, 8 Drawing Sheets

(56) References Cited

FOREIGN PATENT DOCUMENTS

| | | | |
|---|---|---|---|
| JP | 2011-097467 A | 5/2011 | |
| JP | 2012-090204 A | 5/2012 | |
| JP | 2012-165227 A | 8/2012 | |
| JP | 2013-115579 A | 6/2013 | |

* cited by examiner

IMAGE READING APPARATUS

CROSS REFERENCE TO RELATED APPLICATION

The present application claims priority from Japanese Patent Application No. 2014-003412 filed on Jan. 10, 2014 the disclosure of which is incorporated herein by reference in its entirety.

BACKGROUND OF THE INVENTION

1. Field of the Invention

The present invention relates to an image reading apparatus.

2. Description of the Related Art

There is known a conventional image reading apparatus which causes a reading unit to execute a reading operation to read an original while changing a relative position between the reading unit and the original. For example, there is known an image recording apparatus which reads an original by causing a reading unit to execute the reading operation at a predetermined time interval while conveying the reading unit or the original at a constant velocity.

There is known another image reading apparatus which reads an original by causing the reading unit to perform the reading operation each time a motor changing the relative position between the reading unit and the original is rotated by a predetermined amount (see, for example, Japanese Patent Application Laid-open No. 2011-44783).

In this image reading apparatus, a shift pulse is inputted to the reading unit each time the motor is rotated by the predetermined amount. Each time the shift pulse is inputted to the reading unit, the reading unit transmits electric charge accumulated in a photoelectric conversion element to a shift resistor.

The electric charge to be transmitted is generated by the photoelectric effect during a time period from the previous shift pulse to the current shift pulse. The information of the electric charge is converted to an image data corresponding to one line of the original. The transmission causes initialization of the accumulated electric charge in the photoelectric conversion element, and in the reading unit, a new reading operation for accumulating the electric charge is started.

SUMMARY

In the recent years, an attempt is made to read the original not only in a constant velocity segment which is included in the reading operation and in which a conveyance target is conveyed at a constant velocity, but also in acceleration and deceleration segments, for the purpose of reducing the size of the image reading apparatus and for increasing the reading velocity, etc.

In the technique disclosed in Japanese Patent Application Laid-open No. 2011-44783 in which the shift pulse is generated and outputted in accordance with the rotation of the motor, however, an output time interval at which the shift pulse is outputted is increased in the acceleration and deceleration segments, which in turn prolongs a time period during which any noise electric charge is stored in the photoelectric conversion element. Further, an amount of the accumulated electric charge increased due to the prolonged storage time period as described above destabilizes the operation of the image reading apparatus.

In particular, there is assumed a case that any interruption factor occurs during the execution of a series of processes for reading the original per each line starting from the first line to the last line, which in turn interrupts the series of processes and stops the motor temporarily. In such a case, the amount of accumulated electric charge in the photoelectric conversion element becomes very large until the interruption factor is dissolved and the series of processes can be resumed. In this case, there is such a possibility that the photoelectric conversion element might not be appropriately reset unless the shift pulse is inputted several times and that the reading operation by the reading unit might not be stabilized.

As described above, in the conventional technique of merely inputting the shift pulse in accordance with the rotation of the motor, the reading operation for reading the original is difficult to be executed appropriately in the acceleration and deceleration segments.

The present teaching is made in view of the above-described problem, and an object of the present teaching is to provide a technique capable of appropriately executing a reading operation for reading an original in acceleration and deceleration segments of the reading operation, in an image reading apparatus which causes the reading unit to execute the reading operation by conveying at least one of the original and the reading unit so as to change the relative position between the original and the reading unit.

According to an aspect of the present teaching, there is provided an image reading apparatus including: a reading unit configured to read an original in a main scanning direction every time a command signal is inputted to the reading unit; a command unit configured to output the command signal to the reading unit; a conveying unit configured to execute a conveyance processing for conveying at least one of the original and the reading unit so as to change a relative position between the reading unit and the original in a sub scanning direction; a signal output unit configured to output a displacement signal every time the relative position is changed by a predetermined amount; and a control unit configured to control the command unit, wherein the command unit operates in a first mode to output the command signal to the reading unit at a predetermined time interval, and in a second mode to output the command signal to the reading unit at a timing synchronized with the displacement signal, the conveyance processing includes an acceleration segment in which relative velocity between the original and the reading unit is accelerated to a predetermined velocity, a constant velocity segment in which the relative velocity is controlled to be the predetermined velocity, and a deceleration segment in which the relative velocity is decelerated from the predetermined velocity, and the control unit is configured to control the command unit to operate in the first mode in the acceleration and deceleration segments, and to operate in the second mode in the constant velocity segment.

According to the image reading apparatus, the command signal is inputted to the reading unit at the timing synchronized with the displacement signal in the constant velocity segment, and the reading operation by the reading unit is executed. On the other hand, in the acceleration and deceleration segments, basically, the command signal is inputted to the reading unit periodically.

Thus, according to the present teaching, it is possible to suppress any destabilization of the operation of the reading unit which would be otherwise caused by a prolonged storage period of the electric charge in the acceleration and deceleration segments. Further, in the constant velocity segment, the reading unit is allowed to execute the reading operation for reading the original at an appropriate timing according to the displacement.

DESCRIPTION OF THE PREFERRED EMBODIMENTS

An embodiment of the present teaching will be explained as follows, with reference to the drawings. An image reading apparatus 1 of the embodiment and depicted in FIG. 1 includes a CPU 11, a ROM 13, a RAM 15, an interface 17, a FB (flatbed) reading device 20, an ADF (auto document feeder) device 30, and an ASIC 40.

Figure 1:
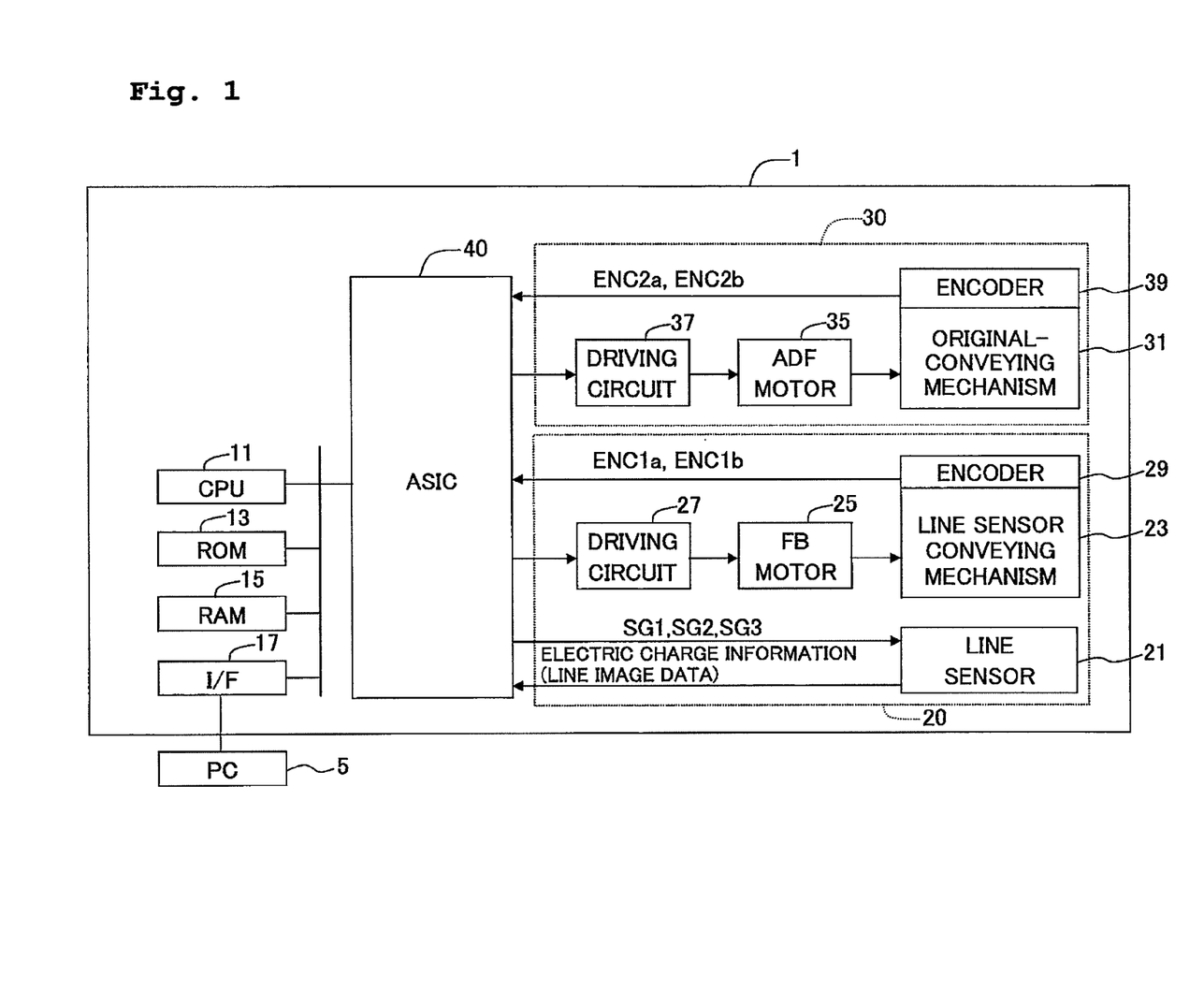
FIG. 1 is a block diagram depicting a schematic configuration of an image reading apparatus.

The CPU 11 controls the image reading apparatus 1 as a whole by executing a processing according to a program(s) stored in the ROM 13. The RAM 15 is used as a workspace when the CPU 11 executes the program(s). The interface 17 is configured to be capable of communicating with an external personal computer 5.

The CPU 11 supplies a read-image data of an original Q generated by using the FB reading device 20 to the external personal computer 5 via the interface 17. The FB reading device 20 is configured to read the original Q as an object to be read, by conveying the line sensor 21. The ADF device 30 is configured to convey the original Q to a reading position at which the original Q is to be read by the line sensor 21. The ASIC 40 controls the FB reading device 20 and the ADF device 30 in accordance with an instruction from the CPU 11.

In the image reading apparatus 1, the CPU 11 sets an operation parameter for the ASIC 40 and activates the ASIC 40. The operation parameter can be exemplified by an operation parameter indicating a reading mode, a reading area, etc. The reading mode can be exemplified by an ADF reading mode, in which the line sensor 21 is arranged in a fixed manner and the original Q is read by the line sensor 21 while conveying the original Q so as to change the relative position between the line sensor 21 and the original Q; and a FB reading mode, in which the line sensor 21 is conveyed to read the original Q placed on a platen glass member 103A.

The ASIC 40 controls the FB reading device 20 and the ADF device 30 in accordance with the operation parameter, and causes the line sensor 21 to execute the reading operation for each line, while changing the relative position between the original Q and the line sensor 21. The line sensor 21 generates, for each of the reading operations, a line image data indicating a result of reading for one line of the original Q. The ASIC 40 executes the shading correction, etc. for each of the line image data generated in such a manner. Each of the corrected line image data generated by the ASIC 40 is stored in the RAM 15.

The CPU 11 transmits each of the line image data stored in the RAM 15 to the personal computer 5 via the interface 17. By doing so, the CPU 11 provide read-image data of the original Q composed of plural line image data. As another example, in a case that the image reading apparatus 1 is a digital multi-function peripheral having a copying function, the read-image data stored in the RAM 15 is subjected to a print processing. With this, a copied image of the original Q is formed on a paper sheet.

Next, the configuration of the FB reading device 20 will be explained in detail. The FB reading device 20 includes the line sensor 21, a line sensor conveying mechanism 23, a FB motor 25, a driving circuit 27 and a FB encoder 29.

The line sensor 21 is configured, for example, as a contact image sensor (CIS). The line sensor 21 is configured to be elongated in a main scanning direction, and to read the original Q in the main scanning direction. The line sensor conveying mechanism 23 receives the driving force from the FB motor 25 constructed of a direct current motor and conveys the line sensor 21 in a sub scanning direction orthogonal to the main scanning direction.

Figure 2:
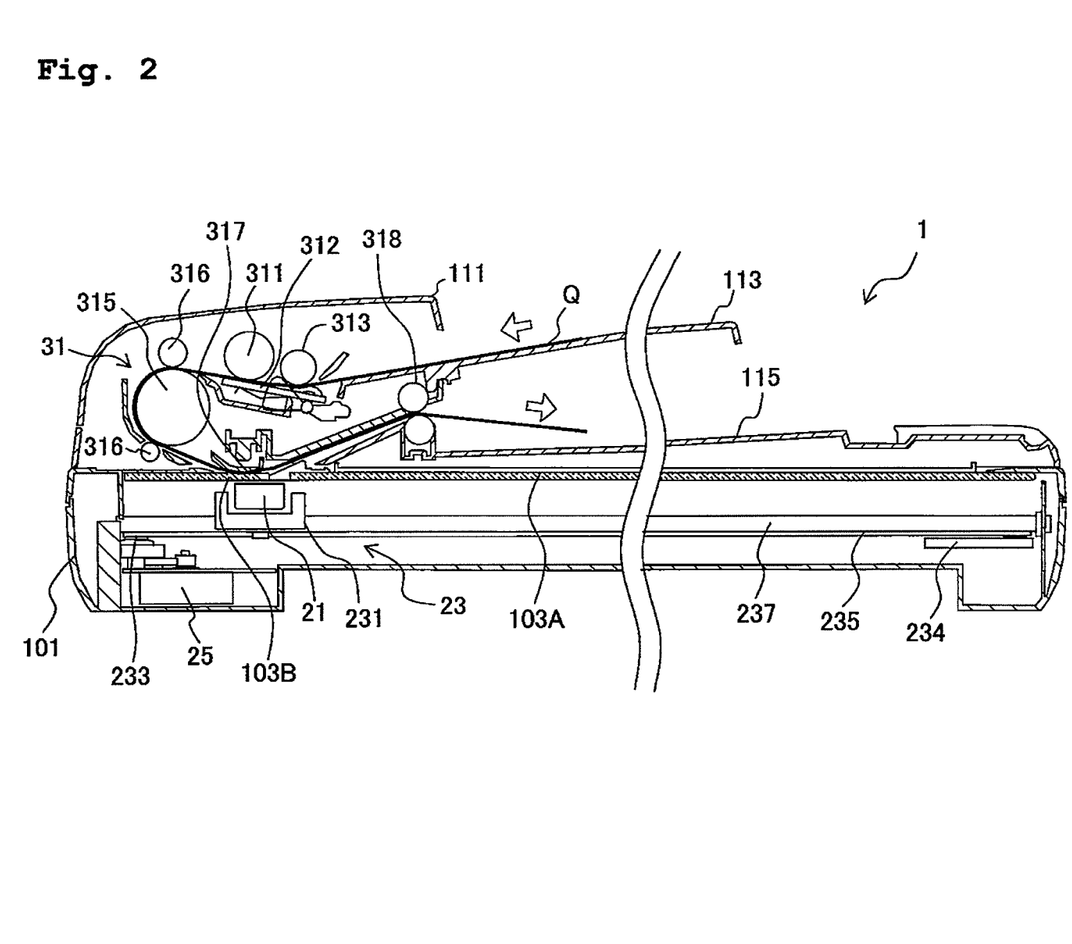
FIG. 2 is a cross-sectional view of the image reading apparatus, depicting a line sensor and a conveying mechanism which conveys an original manuscript (original).

As depicted in FIG. 2, the line sensor conveying mechanism 23 is provided inside a lower case 101 of the image reading apparatus 1. Transparent platen glass members 103A and 103B are arranged on the upper surface of the lower case 101 provided on the image recording sensor 1. The original Q is placed on the upper surface of the platen glass member 103A manually by a user in the FB reading mode. On the other hand, the platen glass member 103B is used in the ADF reading mode. In the ADF reading mode, the line sensor 21 is arranged in fixed manner in an area located below the platen glass member 103B.

The line sensor conveying mechanism 23 is configured to be capable of conveying the line sensor 21 in the sub scanning direction at an area located below the platen glass members 103A and 103B. In the line sensor conveying mechanism 23, a carriage 231 in which the line sensor 21 is placed is attached to a belt 235 wound around and stretched between a driving pulley 233 and a driven pulley 234. The FB motor 25 is connected to the driving pulley 233 via a gear.

Namely, in the line sensor conveying mechanism 23, the driving pulley 233 is rotated by receiving the driving force from the FB motor 25, and the belt 235 and the driven pulley 234 are rotated in accordance with the rotation of the driving pulley 233, thereby transmitting the driving force to the carriage 231 attached to the belt 235. The carriage 231 receiving the driving force moves in the sub scanning direction while being guided by a guide axis 237. By the above-described operation, the line sensor conveying mechanism 23 conveys the line sensor 21 in the sub scanning direction.

The driving circuit 27 drives the FB motor 25 in accordance with a control signal from the ASIC 40. The FB encoder 29 is attached to a driving force-transmitting path from the FB motor 25 to the line sensor 21, and outputs pulse signals (ENC1$a$, ENC1$b$) in accordance with the movement (conveyance) of the line sensor 21 in the sub scanning direction. Each of the pulse signals (ENC1$a$, ENC1$b$) is outputted every time (each time) the line sensor 21 is conveyed in the sub scanning direction by a predetermined distance.

For example, the FB encoder 29 is constructed of a rotary encoder provided on the rotation axis of the FB motor 25. The pulse signals (ENC1$a$, ENC1$b$) correspond to an A-phase signal (ENC1$a$) and a B-phase signal (ENC1$b$) which are different in the phase by $\pi/2$, respectively. In the following, the pulse signals (ENC1a, ENC1b) are also referred to as encoder signals (ENC1a, ENC1b).

On the other hand, the ADF device 30 is provided with an original-conveying mechanism 31, an ADF motor 35, a driving circuit 37 and an ADF encoder 39. The original-conveyance mechanism 31 is provided on an upper case 111 of the image reading apparatus 1, as depicted in FIG. 2. The upper case 111 is provided to be pivotable relative to the lower case 101 of the image recording apparatus 1. The upper case 111 functions as a cover body covering the upper surface of the lower case 101 including the platen glass members 103A and 103B.

The original-conveying mechanism 31 is disposed in the upper case 111 and includes a separation roller 311, a separation pad 312, an intake roller 313, a main roller 315, a pinch roller 316, an original-pressing member 317 and a paper sheet-discharge roller 318.

The separation pad 312 is arranged to face the separation roller 311 and imparts a predetermined conveying resistance to the original Q. The intake roller 313 feeds the original Q (plurality of pieces of the original Q) stacked on an original tray 113 provided on the upper case 111 toward the separation roller 311. The separation roller 311 conveys the original Q toward the main roller 315.

The main roller 315 conveys the original Q conveyed from the separation roller 311 to the downstream in the conveyance path while inverting the conveyance direction of the original Q toward the platen glass member 103B. In this situation, the pinch roller 316 presses the original Q toward the main roller 315. The original-pressing member 317 presses the original Q, conveyed from the side of the main roller 315, against the platen glass member 103B. The paper sheet-discharge roller 318 conveys the original Q which is being conveyed while passing a space underneath the original-pressing member 317, toward a paper sheet-discharge tray 115.

The ADF motor 35 is constructed of a direct current motor and imparts the driving force to the original-conveying mechanism 31. The driving circuit 37 drives the ADF motor 35 in accordance with a control signal from the ASIC 40. The rollers 311, 313, 315 and 318 constructing the original-conveying mechanism 31 receive the driving force from the ADF motor 35 and rotate in mutually cooperative manner.

By causing the rollers 311, 313, 315 and 318 to rotate, the original-conveying mechanism 31 conveys the original Q in the sub scanning direction only by an amount in accordance with the rotation amounts of the rollers 311, 313, 315 and 318 from the original tray 113 to the paper sheet-discharge tray 115 via the original-pressing member 317. In the ADF reading mode, the line sensor 21 is arranged at a location below the original-pressing member 317 and reads the original Q when the original Q passes this location.

The ADF encoder 39 outputs pulse signals (ENC2a, ENC2b) in accordance with the conveyance amount of the original Q by the original-conveying mechanism 31. The ADF encoder 39 is constructed, for example, of a rotary encoder. The ADF encoder 39 is provided, for example, on the rotation axis of the ADF motor 35 and outputs the pulse signals (ENC2a, ENC2b) in accordance with the rotation of the ADF motor 35. Each of the pulse signals (ENC2a, ENC2b) is outputted every time the ADF motor 35 is rotated by a predetermined amount, in other words, every time the original Q is conveyed by a predetermined amount. The pulse signals (ENC2a, ENC2b) correspond to an A-phase signal (ENC2a) and a B-phase signal (ENC2b) which are different in the phase by $\pi/2$, respectively. In the following, the pulse signals (ENC2a, ENC2b) are also referred to as encoder signals (ENC2a, ENC2b).

Figure 3:
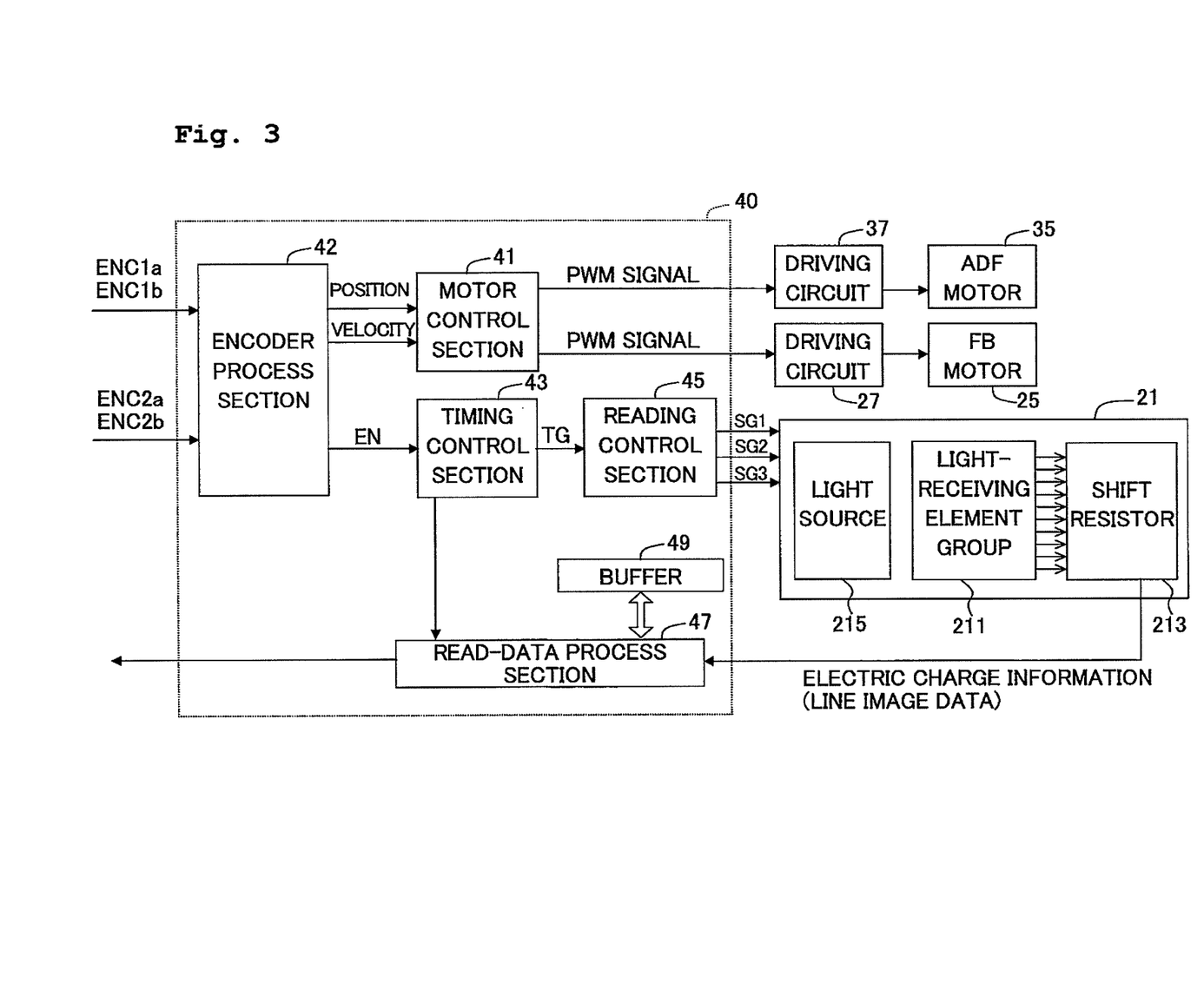
FIG. 3 is a block diagram depicting the inner configuration of an ASIC (Application Specific Integrated Circuit).

Next, the configuration of the ASIC 40 will be explained in detail. The ASIC 40 includes a motor control section 41, an encoder process section 42, a timing control section 43, a reading control section 45, a read-data process section 47 and a buffer 49, as depicted in FIG. 3.

The encoder process section 42 detects the position and velocity of the line sensor 21 based on the encoder signals (ENC1a, ENC1b) inputted from the FB encoder 29 and inputs these detected values to the motor control section 41. Further, the encoder process section 42 detects the rotational position and velocity of the ADF motor 35, which corresponds to the position and velocity of the original Q, based on the encoder signals (ENC2a, ENC2b) inputted from the ADF encoder 39, and inputs these detected values to the motor control section 41.

Furthermore, the encoder process section 42 inputs a displacement signal (EN) corresponding to the reading mode to the timing control section 43. In the FB reading mode, every time the position of the line sensor 21 is changed in the sub scanning direction by a predetermined amount, the encoder process section 42 inputs a pulse signal as the above-described displacement signal (EN) to the timing control section 43 based on the encoder signals (ENC1a, ENC1b) inputted from the FB encoder 29. For example, the encoder process section 42 is capable of inputting any one of the A-phase signal (ENC1a) and the B-phase signal (ENC1b), inputted from the FB encoder 29, to the timing control section 43 as the displacement signal (EN) in the FB reading mode.

On the other hand, in the ADF reading mode, every time the original Q is conveyed by a predetermined amount, the encoder process section 42 inputs a pulse signal as the above-described displacement signal (EN) to the timing control section 43 based on the encoder signals (ENC2a, ENC2b) inputted from the ADF encoder 39. For example, the encoder process section 42 is capable of inputting any one of the A-phase signal (ENC2a) and the B-phase signal (ENC2b), inputted from the ADF encoder 39, to the timing control section 43 as the displacement signal (EN) in the ADF reading mode.

The motor control section 41 controls driving of the FB motor 25 and the ADF motor 35 in accordance with an instruction from the CPU 11. Specifically, in the FB reading mode, the motor control section 41 inputs a PWM signal corresponding to a driving current to be applied to the FB motor 25, to the driving circuit 27, to thereby control the driving of the FB motor 25. The motor control section 41 controls the conveyance velocity of the line sensor 21 in the sub scanning direction by performing a feedback control based on the detected values of the position and velocity of the line sensor 21 inputted from the encoder process section 42.

Further, in the ADF reading mode, the motor control section 41 inputs a PWM signal corresponding to a driving current to be applied to the ADF motor 35, to the driving circuit 37, to thereby control the driving of the ADF motor 35. The motor control section 41 controls the conveyance velocity of the original Q by performing a feedback control based on the detected values of the rotational position and velocity of the ADF motor 35 inputted from the encoder process section 42.

The timing control section 43 controls the reading timing, at which the original Q is read by the line sensor 21, in the FB reading mode and the ADF reading mode. Specifically, the timing control section 43 generates a TG signal, that is a pulse signal for designating the reading timing of the line sensor 21, based on the displacement signal (EN) inputted from the encoder process section 42, and the timing control section 43 inputs the generated TG signal to the reading control section 45.

The reading control section 45 generates a control signal for the line sensor 21 based on the TG signal inputted from the timing control section 43, and inputs the control signal to the line sensor 21. The control signal includes a line start signal (SG1), a lighting control signal (SG2) and a transfer control signal (SG3).

Every time the reading control section 45 detects the rising edge of the TG signal, the reading control section 45 inputs the line start signal (SG1) to the line sensor 21. When the line start signal (SG1) is inputted, the electric charge accumulated in a light-receiving element group 211 provided on the line sensor 21 is transmitted to an analog shift resistor 213. With this, the electric charge, that is generated by the photoelectric effect during a time period from a timing at which the line start signal (SG1) has been inputted to the line sensor 21 last time until a timing at which the line start signal (SG1) is inputted to the line sensor 21 this time, is transmitted to the analog shift resistor 213.

As depicted in FIG. 3, the line sensor 21 includes light-receiving elements each provided for one of pixels (light-receiving element group 211), the analog shift resistor 213 having a size corresponding to the number of the light-receiving elements, and a light source 215. The information of electric charge per each of the light-receiving elements, that is transmitted to the analog shift resistor 213 by the input of the line start signal (SG1), corresponds to a pixel data. Namely, the information aggregation of electric charge stored to the analog shift resistor 213 corresponds to the pixel data aggregation representing a result of reading of one line of the original Q, and corresponds to the line image data.

Due to the transmittance of the accumulated electric charge of the light-receiving element group 211 to the analog shift resistor 213, the accumulated electric charge in each of the light-receiving elements is initialized, and in the light-receiving element group 211, a new reading operation utilizing the photoelectric effect is started.

The lighting control signal (SG2) is a signal for controlling the lighting ON and lighting OFF of the light source 215. The reading control section 45 inputs the lighting control signal (SG2), for lighting ON the light source 215 synchronizing with the input of the line start signal (SG1), to the line sensor 21. Specifically, the reading control section 45 inputs the lighting controlling signal (SG2) to the line sensor 21 so that the light source 215 is switched ON for a predetermined time period from a timing at which the line start signal (SG1) has been inputted. The light source 215 is lighted ON in accordance with the lighting control signal (SG2) and irradiates a light onto the original Q.

The transfer control signal (SG3) is a signal for controlling an operation of transferring the electric charge information, which is stored in the analog shift resistor 213, from the line sensor 21 to the read-data process section 47. When a certain TG signal is inputted to the reading control section 45, the reading control section 45 inputs the transfer control signal (SG3) to the line sensor 21 so that the electric charge information (line image data), that is transferred to the analog shift resistor 213 at a timing at which the line start signal (SG1) corresponding to the certain TG signal has been inputted, is transferred to the read-data process section 47 before next timing at which next line start signal (SG1) will be inputted to the line sensor 21.

The read-data process section 47 converts the electric charge information inputted from the line sensor 21 to digital line image data. Further, the read-data process section 47 performs image processing such as the shading correction, gamma correction, etc. to the line image data, and causes the RAM 15 to store the corrected line image data corrected by such image processing. Among the line image data inputted from the line sensor 21 to the read-data process section 47, the line image data before being corrected and the line image data after being corrected and before being stored to the RAM 15 are temporarily stored in the buffer 49.

In some cases, the available storage capacity of the buffer 49 is reduced by any delay in the processing after the line image data has been corrected in the read-data process section 47 until the corrected line image data is stored in the RAM 15. In a case that the available storage capacity of the buffer 49 is less than a threshold value, the read-data process section 47 inputs a memory full signal to the motor control section 41 so as to temporarily interrupt the conveying operation of the original Q or the line sensor 21 executed by the motor control section 41.

Figure 4:
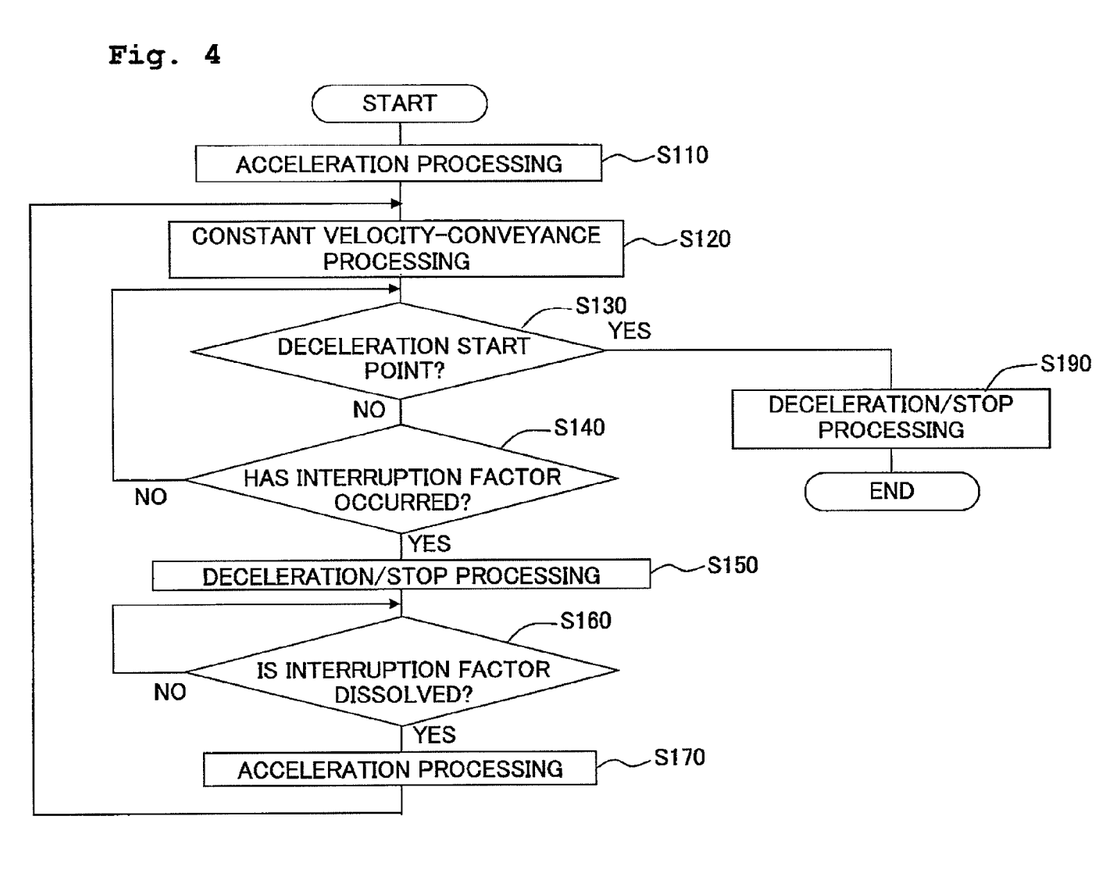
FIG. 4 is a flow chart indicating a processing executed by a motor control section.

The processing operation by the motor control section 41 is executed in accordance with a flow chart indicated in FIG. 4. In the FB reading mode, the motor control section 41 sets the line sensor 21 as the conveyance target, and executes the processing indicated in FIG. 4. In the ADF reading mode, the motor control section 41 sets the original Q as the conveyance target, and executes the processing indicated in FIG. 4. This processing is started by an instruction from the CPU 11 triggered, for example, by a pressing operation by a user made on a non-illustrated operation section.

In a case that the processing is started, the motor control section 41 executes a motor control for accelerating the conveyance target (S110). This motor control is executed until velocity V of the conveyance target reaches a predetermined target velocity Vc. In the FB reading mode, the motor control section 41 determines the driving current to be applied to the FB motor 25 as a motor to be driven, based on the velocity V of the line sensor 21 detected by the encoder process section 42, and inputs a PWM signal corresponding to the determined driving current to the driving circuit 27.

On the other hand, in the ADF reading mode, the motor control section 41 determines the driving current to be applied to the ADF motor 35 as a motor to be driven, based on the rotational velocity of the ADF motor 35 detected by the encoder process section 42 and corresponding to the velocity V of the original Q, and inputs a PWM signal corresponding to the determined driving current to the driving circuit 37. With this, the velocity of the conveyance target is accelerated up to the target velocity Vc in the acceleration segment after the start of conveyance. The term "acceleration segment" described in the embodiment means a conveyance segment until the velocity V of the conveyance target reaches the target velocity Vc.

Afterwards, the motor control section 41 starts a constant velocity-conveyance processing for controlling the velocity V of the conveyance target to be the target velocity Vc (S120). In the constant velocity-conveyance processing, the motor control section 41 determines the driving current to be applied to the motor (FB motor 25 or ADF motor 35) so that the conveyance target is conveyed at a constant velocity that is the target velocity Vc, and the motor control section 41 inputs a PWM signal corresponding to the determined driving current to the driving circuit 27 or 37 corresponding to the conveyance target. With this, in the constant velocity segment following the acceleration segment, the conveyance target is conveyed at the target velocity Vc. The term "constant velocity segment" described in the embodiment means a segment in which the velocity V of the conveyance target is maintained at a constant velocity (target velocity Vc).

After that, the motor control section 41 judges whether or not the conveyance target has reached a deceleration start point (S130). The deceleration start point is set as follows. Namely, at first, a reading completion point is determined as a position of the conveyance target at a timing when the reading operation for the last line of the original Q is completed. Then, the deceleration start point is set as a same point with the reading completion point, or a point around the reading completion point.

In a case that the motor control section 41 judges that the conveyance target has reached the deceleration start point (S130: YES), the process proceeds to S190 and performs a motor control for decelerating and stopping the conveyance target. With this motor control, the conveyance target is decelerated and stopped in the deceleration segment following the constant velocity segment. The term "decelerating segment" described in the embodiment means a conveyance segment in which the velocity V of the conveyance target is decelerated from the target velocity Vc until the conveyance target is stopped.

In a case that the deceleration start point is set at a point upstream of the reading completion point, the line sensor 21 executes the reading operation for each of the lines, even in the deceleration segment, in accordance with the control signal from the reading control section 45 until the conveyance target has passed through the reading completion point.

Additionally, in the ADF reading mode, when the reading operation up to the last line is completed, a judgment is made in S130 that the original Q as the conveyance target has reached the deceleration start point. In S190, the original Q as the conveyance target is continuously conveyed, without decreasing the velocity V of the original Q, until the original Q is discharged to the paper sheet-discharge tray 115. Afterward, the motor control section 41 ends the processing indicated in FIG. 4.

On the other hand, in a case that the motor control section 41 judges that the conveyance target has not reached the deceleration start point (S130: NO), the motor control section 41 judges whether or not any interruption factor for the motor control has occurred (S140). Specifically, the motor control section 41 judges that the interruption factor has occurred, under a condition that the memory full signal is inputted to the motor control section 41 from the read-data process section 47.

In a case that the motor control section 41 judges that any interruption factor has not occurred (S140: NO), the process proceeds to S130. In a case that the motor control section 140 judges that the interruption factor has occurred (S140: YES), the process proceeds to S150. After proceeding to S150, the motor control section 41 starts the motor control for decelerating and stopping the conveyance target. The TG signal is inputted from the timing control section 43 to the reading control section 45 also during the deceleration and stopping of the conveyance target by this motor control, and the reading operation by the line sensor 21 is executed continuously and repeatedly.

Then, the motor control section 41 stands by until the interruption factor is dissolved (S160). For example, the motor control section 41 stands by until the available storage capacity of the buffer 49 has become a value not less than the threshold value.

In a case that the motor control section 41 judges that the interruption factor has been dissolved (S160: YES), the motor control section 41 controls the motor in a similar manner as the processing in S110, and accelerates the conveyance target up to the target velocity Vc (S170). Afterwards, the process proceeds to S120 and the motor control section 41 controls the motor to thereby convey the conveyance target at the constant velocity of the target velocity Vc.

In such a manner, the motor control section 41 controls the velocity V of the conveyance target in the FB reading mode and the ADF reading mode, and repeatedly executes the motor controls for decelerating and stopping of the conveyance target and for accelerating the conveyance target, depending on the occurrence of any interruption factor.

Next, the configuration of the timing control section 43 will be explained in detail with reference to FIGS. 5 to 8. The timing control section 43 of the present embodiment has a first function (an example of the first mode) to output the TG signal to the reading control section 45 at a predetermined time interval, and a second function (an example of the second mode) to output the TG signal to the reading control section 45 at a timing synchronized with the displacement signal (EN).

In a state that the first function is enabled, the line start signal (SG1) is inputted from the reading control section 45 to the line sensor 21 at a constant period, which in turn causes the line sensor 21 to execute a periodic reading operation. On the other hand, a state that the second function is enabled, the line start signal (SG1) is inputted from the reading control section 45 to the line sensor 21 every time the conveyance target is displaced by a predetermined amount, which in turn causes the line sensor 21 to execute a reading operation synchronized with the displacement of the conveyance target.

As described above, the conveyance processing for conveying the conveyance target executed by the motor control includes the acceleration segment in which the velocity V of the conveyance target is raised up to the target velocity Vc, the constant velocity segment in which the velocity V of the conveyance target is controlled to be the target velocity Vc, and the deceleration segment in which the velocity V of the conveyance target is lowered from the target velocity Vc. In the acceleration and deceleration segments, the TG signal is inputted to the reading control section 45 basically by the first function, whereas in the constant velocity segment, the TG signal is inputted to the reading control section 45 by the second function.

Figure 5:
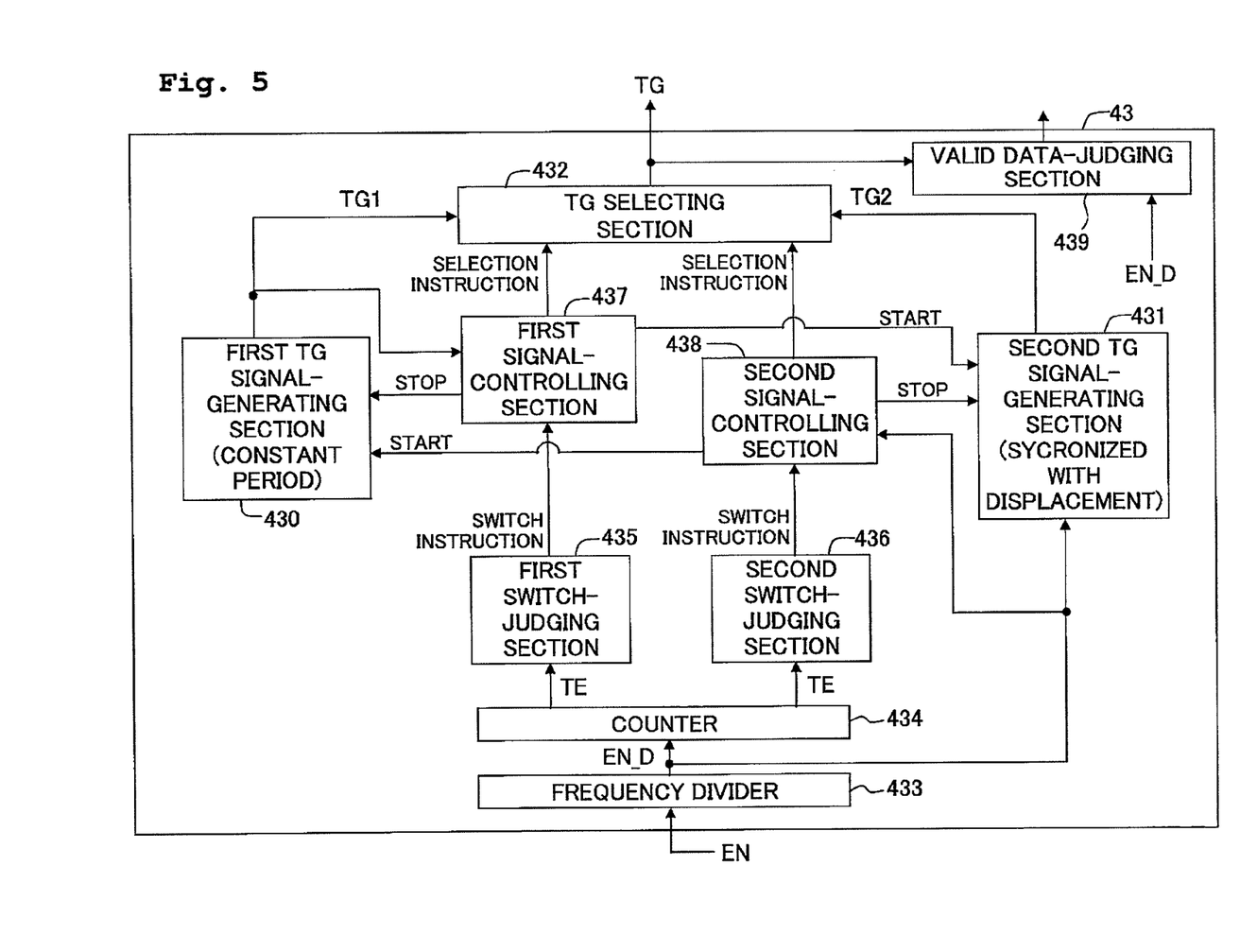
FIG. 5 is a block diagram depicting the configuration of a timing control section.

The timing control section 43 having the above-described first and second functions includes a first TG signal-generating section 430, a second TG signal-generating section 431, a TG selecting section 432, a frequency divider 433, a counter 434, a first switch judging section 435, a second switch judging section 436, a first signal-controlling section 437, a second signal-controlling section 438 and a valid data-judging section 439, as depicted in FIG. 5.

The first TG signal-generating section 430 is configured to start and stop a generation operation for generating a periodic pulse signal as a first TG signal (TG1), by receiving a generation start instruction from the second signal-controlling section 438 and generation stop instruction from the first signal-controlling section 437, respectively. With a timing (reference timing) at which the generation start instruction has been received as the reference, the first signal-generating section 430 inputs, the pulse signal as the first TG signal, to the TG selecting section 432 each time a predetermined time T0 elapses from the reference timing.

On the other hand, the second TG signal-generating section 431 is configured to start and stop a generation operation for generating a pulse signal as a second TG signal (TG2) which is synchronized with a divided displacement signal (EN_D; hereinafter referred also to as "displacement signal (EN_D)" in some cases) inputted from the frequency divider 433, by receiving a generation start instruction from the first signal-controlling section 437 and generation stop instruction from the second signal-controlling section 438, respectively. The second TG signal-generating section 431 generates the pulse signal every time the second TG signal-generating section 431 detects the rising edge of the displacement signal (EN_D) inputted from the frequency divider 433, and inputs the generated pulse signal as the second TG signal (TG2) to the TG selecting section 432.

The TG selecting section 432 is configured to select one of the first TG signal (TG1) inputted from the first TG signal-generating section 430 and the second TG signal (TG2) inputted from the second TG signal-generating section 431, based on selection instructions inputted from the first signal-controlling section 437 and the second signal-controlling section 438, and to input one of the first and second TG signals (TG1, TG2) to the reading control section 45, as the TG signal.

The frequency divider 433 divides a displacement signal (EN) inputted from the encoder process section 42 and inputs a divided displacement signal (EN_D) to the second TG signal-generating section 431, the counter 434, the second signal-controlling section 438 and the valid data-judging section 439. The division ratio is determined so that the displacement amount of the conveyance target corresponding to the appearance time interval of the rising edge of the divided displacement signal (EN_D), is a distance corresponding to the width of one line of the original Q in the sub scanning direction.

The counter 434 detects the rising edge in the divided displacement signal (EN_D), and every time the rising edge appears, the counter 434 counts an elapsed time elapsed from an appearance timing of the rising edge of the displacement signal (EN_D), to thereby measure an appearance time interval TE of the rising edge. The appearance time interval TE (hereinafter referred to as "positional period") measured by the counter 434 is inputted to the first switch judging section 435 and the second switch judging section 436.

Under a condition that the positional period TE is changed from a value not less than a predetermined first reference value TH1 to a value less than the first reference value TH1 (TE<TH1), the first switch judging section 435 is configured to input a switch instruction to the first signal-controlling section 437 at this timing at which the positional period TE is changed as described above.

Figure 6:
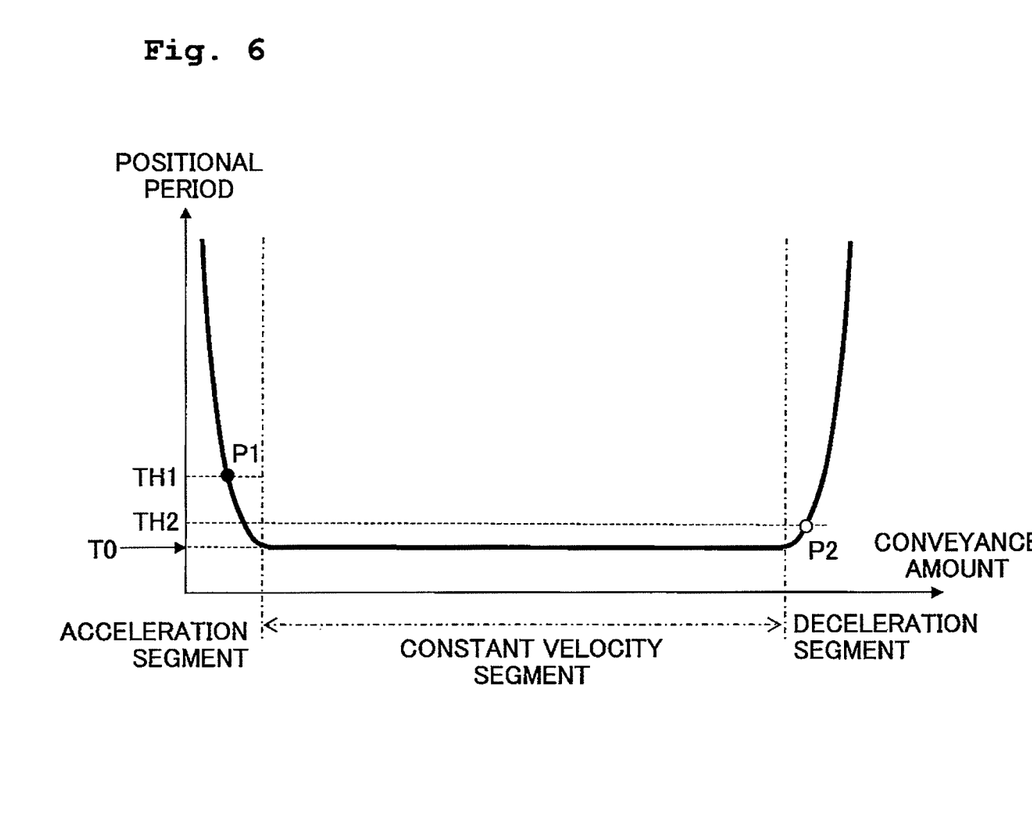
FIG. 6 is a graph indicating the change in positional period of a conveyance target in a conveyance processing.

FIG. 6 indicates a timing P1, as a black solid dot, at which the switch instruction is inputted from the first switch judging section 435 to the first signal-controlling section 437. FIG. 6 is a graph indicating the conveyance amount of the conveyance target with the horizontal axis and indicating the positional period TE with the vertical axis, wherein the change in the positional period TE in the conveyance processing of the conveyance target is indicated by a bold line.

The switch instruction is inputted from the first switch judging section 435 to the first signal-controlling section 437 in the acceleration segment for the conveyance target. In the embodiment, the first reference value TH1 is set to be 2.5 times a period T0 of the first TG signal (TG1) generated by the first TG signal-generating section 430. The period T0 of the first TG signal (TG1) corresponds to the positional period TE in the constant velocity segment, as appreciated from FIG. 6.

On the other hand, the second switch judging section 436 is configured such that under a condition that the positional period TE is changed from a value less than a predetermined second reference value TH2 to a value not less than the second reference value TH2 (TE≥TH2), the second switch judging section 436 inputs a switch instruction to the second signal-controlling section 438 at this timing at which the positional period TE is changed as described above. A timing P2, at which the switch instruction is inputted from the second switch judging section 436 to the second signal-controlling section 438, is indicated as a white round dot in FIG. 6. In this embodiment, the second reference value TH2 is set to be 1.5 times the period T0 of the first TG signal (TG1).

In a case that the switch instruction is inputted to the first signal-controlling section 437 from the first switch judging section 435 at the timing (P1), the first signal-controlling section 437 inputs a stop instruction to the first TG signal-generating section 430 at a timing P3 (see FIG. 7), at which a certain first TG signal (TG1) is inputted from the first TG signal-generating section 430 to the TG selecting section 432 for the first time since the timing P1. The first signal-controlling section 437 stops the operation of the first TG signal-generating section 430 at a timing at which the input of the certain first TG signal (TG1) has been completed. At the same time, the first signal-controlling section 437 inputs the generation start instruction to the second TG signal-generating section 431 so that the second TG signal-generating section 431 starts a generating operation of the second TG signal (TG2) based on the rising edge of the displace signal (EN_D).

Figure 7:
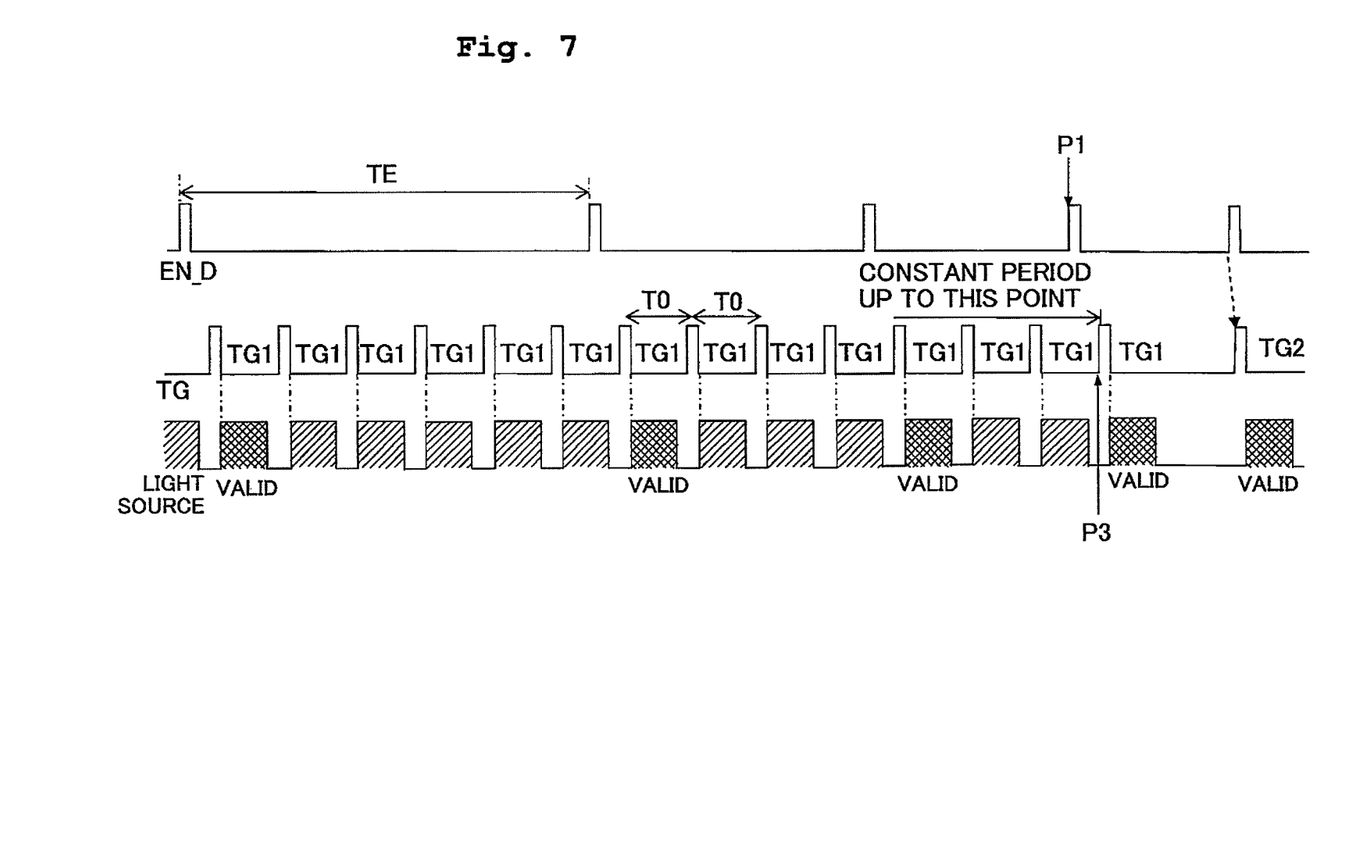
FIG. 7 is a time chart indicating the waveform of a TG signal in an acceleration segment of the conveyance processing.

Further, the first signal-controlling section 437 inputs a selection instruction to the TG selecting section 432 in accordance with the input of the generation start instruction so that the TG selecting section 432 inputs the second TG signal (TG2) to the reading control section 45 instead of inputting the first TG signal (TG1). From a timing at which this selection instruction is inputted, the TG selecting section 432 selectively inputs the second TG signal (TG2) to the reading control section 45.

On the other hand, when the switch instruction is inputted to the second signal-controlling section 438 from the second switch judging section 436, the second signal-controlling section 438 inputs a stop instruction to the second TG signal-generating section 431 at a timing P4 (see FIG. 8), at which a certain second TG signal (TG2) based on the rising edge of a certain displacement signal (EN_D) triggering the input of the switch instruction, is inputted to the reading control section 45 via the TG selecting section 432, and at a timing at which the input of the certain second TG signal (TG2) has been completed, the second signal-controlling section 438 stops the operation of the second TG signal-generating section 431. At the same time, the second signal-controlling section 438 inputs the generation start instruction to the first TG signal-generating section 430 to start the generation of the first TG signal (TG1).

Figure 8:
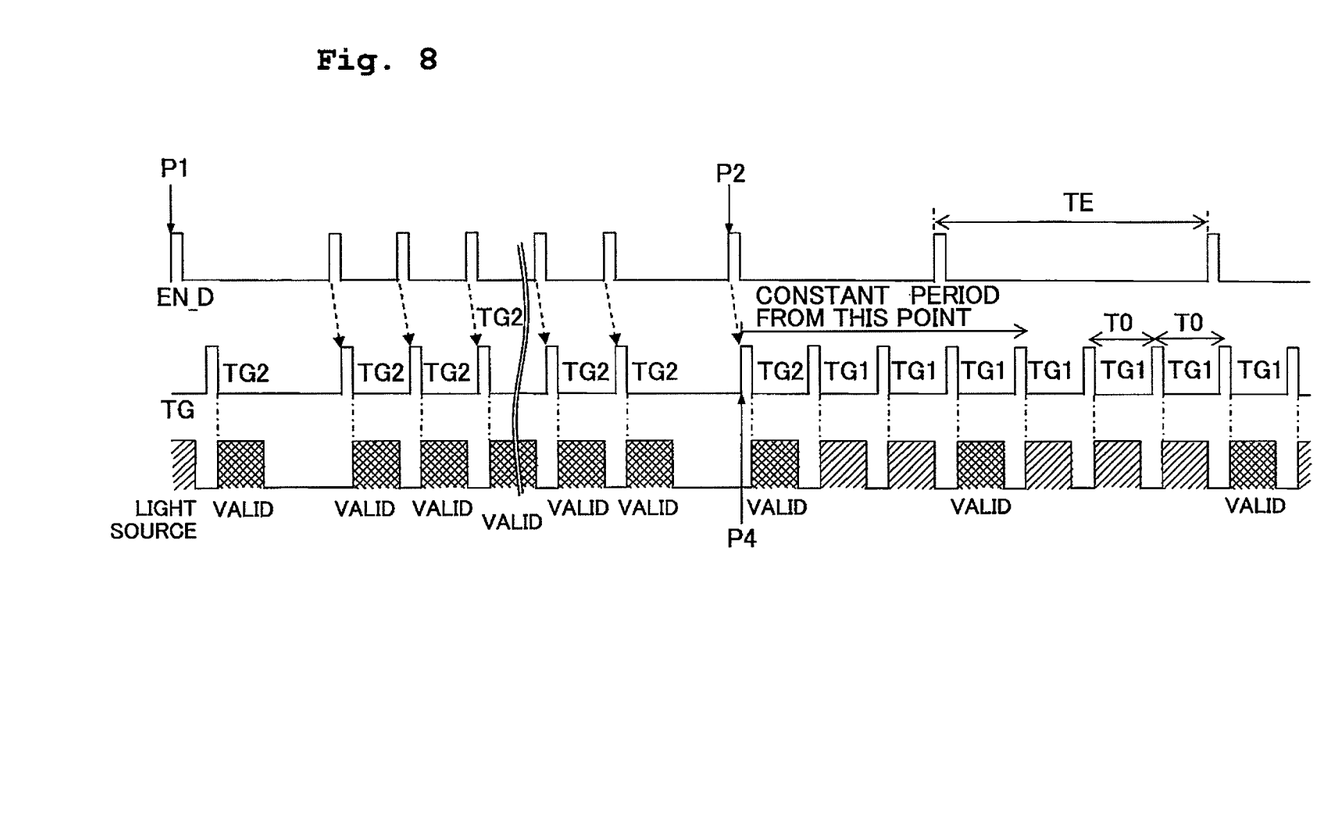
FIG. 8 is a time chart indicating the waveform of the TG signal in a deceleration segment of the conveyance processing.

Note that the switch instruction from the second switch judging section 436 is generated at a timing at which the rising edge of the displacement signal (EN_D) appears and the positional period TE measured by the counter 434 is updated. The rising edge, of the displacement signal, which triggers the input of the switch instruction means such a rising edge that triggers the change of the positional period TE from the value less than the second reference value TH2 to the value not less than the second reference value TH2.

The second signal-controlling section 438 inputs a selection instruction to the TG selecting section 432 in accordance with the input of the generation start instruction so that the TG selecting section 432 inputs the first TG signal (TG1) to the reading control section 45 instead of inputting the second TG signal (TG2). After the selection instruction has been inputted to the TG selecting section 432, the TG selecting section 432 selectively inputs the first TG signal (TG1) to the reading control section 45, from a certain timing at which the first TG signal (TG1) is inputted from the first TG signal-generating section 430 to the TG selecting section 432 for the first time. The first signal (TG1) is inputted to the TG selecting section 432 as a pulse signal having the period T0, with the timing P4 as the reference.

Note that, however, in a case that the first TG signal-generating section 430 is configured to generate, as the first TG signal (TG1), a pulse signal rising at a timing at which the first TG signal-generating section 430 receives the generation start instruction and to input the generated first TG signal (TG1) to the TG selecting section 432, the second TG signal-generating section 438 may be configured to input the generation start instruction to the first TG signal generating section 430 at a timing elapsed, by a predetermined time T0, from the timing P4 at which the switch instruction has been inputted and a second TG signal (TG2) corresponding to the switch instruction has been inputted to the reading control section 45.

According to the timing control section 43 configured in this manner, the TG signal is inputted to the reading control section 45 with patterns as depicted in FIGS. 7 and 8, and the reading operations corresponding to these patterns, respectively, are executed by the line sensor 21.

Based on the TG signal inputted to the reading control section 45 and the displacement signal (EN_D) inputted from the frequency divider 431 to the valid data judging section 439, the valid data-judging section 439 judges, at each appearance (occurrence) of the rising edge of the displacement signal (EN_D), a line image data corresponding to an electric charge information transmitted to the analog shift resistor 213 by a TG signal which is generated secondly after the timing of appearance of the rising edge, as a valid data. Then, the valid data-judging section 439 inputs a result of this judgment to the read data-process section 47.

The line image data judged as the valid data is a line image data based on the electric charge accumulated in the light-receiving element group 211 during a time period that is after appearance of the rising edge of the displacement signal (EN_D) and ranging from first generation timing of the TG signal until second generation timing of the TG signal.

In accordance with such a result of judgment by the valid data-judging section 439, the read-data process section 47 selects one line image data at each rising edge of the displacement signal (EN_D) (in other words, at each conveyance, of the conveyance target, corresponding to one line of the original), the one line image being included in plural line image data generated by the reading operations executed by the line sensor 21 a plurality times respectively. The read-data process section 47 transmits the selected one line image data to the RAM 15 and discards remaining line image data among the plural line image data and different from the selected one image data.

FIG. 7 is a time chart indicating the waveform of the divided displacement signal (EN_D) in the first stage, indicating the waveform of the TG signal in the second stage, and indicating ON/OFF of the light source 215 in the third stage. In the third stage of FIG. 7, a hatched area depicted with diagonal lines indicates that a line image data corresponding to the electric charge accumulated in the light-receiving element group 211 during this lighted-ON period of the light source 215 is judged as a non-valid data. On the other hand, a hatched area depicted with mesh lines indicates that a line image data corresponding to the electric charge accumulated in the light-receiving element group 211 during the lighted-ON period of the light source 215 is judged as a valid data.

As appreciated from FIG. 7, although the position period TE becomes gradually shorter in the segment in which the velocity of the conveyance target is accelerated, the periodic first TG signal (TG1) is inputted to the reading control section 45 at the time interval T0 until the position period PE becomes a value less than the first reference value TH1. With this, the line sensor 21 executes the reading operation regularly at the period T0.

Further, even when the position period TE has become a value less than the first reference value TH1 at the timing P1, the line sensor 21 executes the periodic reading operation until the timing P3 at which the first TG signal (TG1) is inputted to the reading control unit 45 for the first time since the timing P1.

On the other hand, based on the selection instruction inputted to the TG selecting section 432 from the first TG signal-controlling section 437, the TG selecting section 432 inputs the second TG signal (TG2) to the reading control section 45, instead of inputting the first TG signal (TG1), at the rising edge of the displacement signal (EN_D) which appears after the timing P3. With this, in the acceleration segment and constant velocity segment after the timing P3, the second TG signal (TG2) is inputted to the reading control section 45 at each appearance of the rising edge of the displacement signal (EN_D). By doing so, the line sensor 21 executes the reading operation every time the conveyance target is conveyed by an amount corresponding to one line of the original.

FIG. 8 is a time chart, after the timing P1 indicated in FIG. 7, indicating the waveform of the displacement signal (EN_D), the waveform of the TG signal, and the ON/OFF of the light source 215 in the first to third stages, respectively.

As appreciated from FIG. 8, although the position period TE becomes gradually longer in the segment which follows after the end of the constant velocity segment and in which the velocity of the conveyance target is decelerated, the second TG signal (TG2) corresponding to the rising edge of the displacement signal (EN_D) is inputted to the reading control section 45 until the position period TE becomes a value not less than the second reference value TH2.

Then, the position period TE determined by the appearance of the rising edge of the displacement signal (EN_D) has become the value not less than the second reference value TH2 (timing P2), and after the timing P4 at which the second TG signal (TG2) based on the rising edge of the displacement signal (EN_D) is inputted to the reading control section 45 via the TG selecting section 432, the first TG signal (TG1) is inputted to the reading control section 45 at the time interval T0 from the timing P4 via the TG selecting section 432. With this, in the deceleration segment after the timing P4, the line sensor 21 executes the periodic reading.

The image reading apparatus 1 of the embodiment has been explained as above. The first signal-controlling section 437 and the second signal-controlling section 438 control the TG selecting section 432 so that the line start signal (SG1) is periodically inputted to the line sensor 21 by the first function in the acceleration and deceleration segments of this embodiment.

On the other hand, in the constant velocity segment, the first signal-controlling section 437 and the second signal-controlling section 438 control the TG selecting section 432 so that the line start signal (SG1) is inputted to the line sensor 21 by the second function every time the conveyance target is conveyed by an amount corresponding to one line of the original.

Thus, according to the image reading apparatus 1 of the embodiment, it is possible to suppress any destabilization of the operation of the line sensor 21 caused by any prolonged storage period for storing the electric charge in the acceleration and deceleration segments. On the other hand, the line sensor 21 is allowed to execute the reading operation for reading the original at an appropriate timing, based on the displacement of the conveyance target, in the constant velocity segment.

According to the embodiment, there is such a case that, for example, the available storage capacity of the buffer 49 is reduced to be insufficient, which in turn temporarily interrupts (pauses) the conveying operation for the conveyance target before the reading operation of the last line of the original Q is completed, and thus the pulse edge of the displacement signal does not appear for a long period of time.

Provided that the generation operation of the TG signal based on the displacement signal were executed in such a case in a similar manner in the constant velocity segment, the accumulated electric charge in the light-receiving element group 211 is saturated due to the prolonged period in which no TG signal is generated. Accordingly, there is such a possibility that the operation of the line sensor 21 might be unstable unless the line start signal (SG1) is inputted a plurality of time.

On the other hand, according to the embodiment, the TG signal is repeatedly generated at the constant time interval T0 even if the conveyance of the conveyance target is temporarily paused, and the accumulation of electric charge in the light-receiving element group 211 is initialized (reset). Owing to this configuration, any excessive electric charge is not accumulated in the light-receiving element group 211. Thus, according to the present embodiment, when the interrupted conveyance is resumed, the reading operation of the original Q can be executed by the line sensor 21 appropriately from a position (location) at which the interruption has occurred.

Thus, according to the embodiment, the reading operation for each line of the original can be executed even when reading the original with any acceleration and deceleration, thereby realizing generation of read-image data with high quality. Here, although an explanation has been given about the abnormality in the accumulated electric charge in a case of completely stopping the conveyance target, the abnormality in the accumulated electric charge might occur also in a case of conveying the conveyance target at a low velocity. According to the embodiment, in a case that the position period TE is at least greater than 2.5 times the reading period T0 adopted during the constant velocity segment, the TG signal is generated at the constant period T0. Thus, even during a period in which the conveyance target is conveyed at a low velocity, the line sensor 21 can be operated stably, thereby making it possible to generate an appropriate read-image data.

Further, according to the embodiment, the switching between the periodic first TG signal (TG1) and the second TG signal (TG2) based on the displacement signal is executed to input the first or second TG signal (TG1 or TG2) to the reading control section 45. In the embodiment, in order to execute the switching smoothly, even in a case that the position period TE becomes a value less than the first reference value TH1 (namely, even in a case that the position period TE is lowered to be less than the first reference value TH1), the switching of the TG signal to be inputted to the reading control section 45 is not executed until the input of the first TG signal after the position period TE is lowered to be less than the first reference value TH1.

Furthermore, in the embodiment, in a case that the position period TE has become a value not less than the second reference value TH2 (namely, the position period TE is increased to be more than the second reference value TH2), the embodiment is configured such that the first TG signal-generating section 430 is allowed to generate the periodic first TG signal (TG1), from the timing P4 at which the second TG signal (TG2) has been inputted to the reading control section 45 triggered by the above increase in the value of the position period TE, and that the periodic first TG signal (TG1) is inputted to the reading control section 45.

Thus, according to the embodiment, the switching can be executed smoothly, and the reading operation of the original Q can be executed by the line sensor 21 appropriately in the acceleration segment, the constant velocity segment and the deceleration segment.

In addition, according to the embodiment, the first reference value TH1 is set to be a value greater than the second reference value TH2. The switching of the TG signal based on the first reference value TH1 is executed in an environment in which the position period TE gradually becomes to be shorter, whereas the switching of the TG signal based on the second reference value TH2 is executed in an environment in which the position period TE gradually becomes to be longer. Thus, according to the embodiment, the switching of the TG signal can be executed at a timing more appropriately than in a case of setting the first reference value TH1 to have a same value as the second reference value TH2.

Further, according to the embodiment, even when the position period TE is lowered to be less than the first reference value TH1, the switching of the TG signal is not executed until the first TG signal is generated after the above lowering in the position period TE. In other words, there is a possibility that the switching of the TG signal might be delayed from the timing P1, at which the position period TE is lowered to be less than the first reference value TH1, up to by an amount corresponding to the period T0, at the greatest. Provided that a value less than two times the period T0 were set as the first reference value TH1, there is such a possibility that the generation time interval at which the TG signal is generated at the switching timing might be shorter than the period T0. Namely, there is such a possibility that the generation time interval of the TG signal at the switching timing might be shorter than a period of time until the transmission of the electric charge in the line sensor 21 is completed.

On the other hand, provided that a value not less than 3 times the period T0 were set as the first reference value TH1, there is such a possibility that the input time interval of the TG signal might change by an amount not less than 3 times before and after the switching of the TG signal. According to the embodiment, since the value corresponding to 2.5 times the period T0 is set as the first reference value TH1 as described above, it is possible to switch the TG signal at an appropriate timing, while suppressing such a change of the input time interval.

Similarly, according to the embodiment, since the value which is 1.5 times the period T0 is set as the second reference value TH2 as described above, it is possible to suppress the change in the input time interval of the TG signal in the deceleration segment caused by the switching of the TG signal.

Although the embodiment of the present teaching has been explained as above, the present teaching is not limited to the embodiment described above, and may be modified to have a variety of kinds of aspects. For example, the line sensor 21 may be any of a monochrome image sensor and a color image sensor. In a case that a color image sensor is adopted as the line sensor 21, the reading control section 45 may be configured to input, to the line sensor 21, a control signal based on TG signals for causing the line sensor 21 to generate line image data of three colors (red, green, blue).

In addition, the embodiment has been explained with the example in which the line sensor 21 is conveyed in a state that the original Q is fixed to thereby change the relative position between the line sensor 21 and the original Q in the sub scanning direction, and another example in which the original Q is conveyed in a state that the line sensor 21 is fixed to thereby change the relative position between the original Q and the line sensor 21 in the sub scanning direction. However, the technical idea of the embodiment is applicable also to an image reading apparatus which conveys both of the line sensor and the original to thereby change the relative position between the original Q and the line sensor in the sub scanning direction.

Further, the processing and the motor control for switching the TG signal, etc. may be realized by a hardware or by a software, or a combination of the hardware and software.

Finally, the correspondence in the present teaching is provided as follows. The line sensor 21 corresponds to an example of the reading unit. The line sensor conveying mechanism 23, the original-conveying mechanism 31, the FB motor 25, the ADF motor 35, the driving circuits 27, 37 and the motor control section 41 correspond to an example of the conveying unit.

In addition, the FB encoder 29, the ADF encoder 39 and the encoder process section 42 correspond to an example of the signal output unit. The first TG signal-generating section 430, the second TG signal-generating section 431 and the TG selecting section 432 (and the reading control section 45) correspond to an example of the command unit. The TG signal and the line start signal (SG1) correspond to an example of the command signal. Other than those, the first and second signal-controlling sections 437 and 438 and the first and second switch judging sections 435 and 436 correspond to an example of the control unit.

What is claimed is:

1. An image reading apparatus comprising:
a reading unit configured to read an original in a main scanning direction every time a command signal is inputted to the reading unit;
a command unit configured to output the command signal to the reading unit;
a conveying unit configured to execute a conveyance processing for conveying at least one of the original and the reading unit so as to change a relative position between the reading unit and the original in a sub scanning direction;
a signal output unit configured to output a displacement signal every time the relative position is changed by a predetermined amount; and
a control unit configured to control the command unit,
wherein the command unit operates in a first mode to output the command signal to the reading unit at a predetermined time interval, and in a second mode to output the command signal to the reading unit at a timing synchronized with the displacement signal,
the conveyance processing includes an acceleration segment in which relative velocity between the original and the reading unit is accelerated to a predetermined velocity, a constant velocity segment in which the relative velocity is controlled to be the predetermined velocity, and a deceleration segment in which the relative velocity is decelerated from the predetermined velocity, and
the control unit is configured to control the command unit to operate in the first mode in the acceleration and deceleration segments, and to operate in the second mode in the constant velocity segment.

2. The image reading apparatus according to claim 1, wherein the control unit is configured to control the command unit to operate in the first mode or the second mode based on an output time interval at which the displacement signal is outputted from the signal output unit.

3. The image reading apparatus according to claim 2, wherein the control unit is configured to control the command unit to operate in the second mode, under a condition that the output time interval of the displacement signal has decreased beyond a predetermined first reference value determined in the acceleration segment, and
the control unit is configured to determine that the command unit operates in the first mode, under a condition that the output time interval of the displacement signal has increased beyond a predetermined second reference value determined in the deceleration segment.

4. The image reading apparatus according to claim 3, wherein the control unit is configured to control the command unit to operate in the second mode, under a condition that the output time interval of the displacement signal has lowered to be less than the first reference value and that the command signal has been inputted to the reading unit by the first input mode.

5. The image reading apparatus according to claim 3, wherein under a condition that the output time interval of the displacement signal has increased to be more than the second reference value and that the command signal has been inputted to the reading unit by the second input mode, the control unit is configured to control the command unit to operate in the first mode since an input timing at which the command signal has been inputted by the second input mode.

6. The image reading apparatus according to claim 3, wherein the first reference value is greater than the second reference value.

7. The image reading apparatus according to claim 4, wherein the first reference value is equal to a value that is 2.5 times the predetermined time interval.

8. The image reading apparatus according to claim 5, wherein the second reference value is equal to a value that is 1.5 times the predetermined time interval.

* * * * *